Oct. 22, 1957 R. L. SARGISSON ET AL 2,810,792
TELEPHONE SWITCH HOOK ASSEMBLY
Filed Oct. 5, 1954 3 Sheets-Sheet 1

INVENTORS.
ROBERT L. SARGISSON
FREDRIC E. WOOD
BY Wm. Walter Owen.
ATTY.

Oct. 22, 1957 R. L. SARGISSON ET AL 2,810,792

TELEPHONE SWITCH HOOK ASSEMBLY

Filed Oct. 5, 1954 3 Sheets-Sheet 2

INVENTOR.
ROBERT L. SARGISSON
FREDRIC E. WOOD
BY Wm. Watts Owen
ATTY.

Oct. 22, 1957 R. L. SARGISSON ET AL 2,810,792

TELEPHONE SWITCH HOOK ASSEMBLY

Filed Oct. 5, 1954 3 Sheets-Sheet 3

INVENTOR.
ROBERT L. SARGISSON
FREDRIC E. WOOD

BY Wm Walter Owen.

ATTY.

United States Patent Office 2,810,792

Patented Oct. 22, 1957

2,810,792

TELEPHONE SWITCH HOOK ASSEMBLY

Robert L. Sargisson, Berwyn, and Fredric E. Wood, McHenry, Ill., assignors to General Telephone Laboratories, Incorporated, a corporation of Delaware Application October 5, 1954, Serial No. 460,337

8 Claims. (Cl. 179—159)

This invention relates to telephone substation apparatus and more particularly to the operating means for controlling the operation of the switch hook spring contacts.

In known telephone substation sets a mounting for the handset usually comprises a housing, or casing, having a cradle portion for accommodating the telephone handset and a switch hook assembly including switch hook spring contacts mounted within the casing for connecting the transmitter, receiver, dial and ringer to the telephone line extending to the telephone exchange. Switch hook operating mechanism is mounted within the casing and plungers extending through the cradle operate the switch hook operating mechanism when the handset is on the cradle to operate the switch hook contacts to on-hook position to enable the substation to receive incoming calls. Spring means is provided in the switch hook operating mechanism for operating the switch hook contacts to off-hook position to answer incoming calls or to originate outgoing calls.

The main object of the present invention is the provision of an improved switch hook operating mechanism which enables the switch hook contacts to be maintained in on-hook position when the housing is removed thereby enabling the substation to receive incoming calls even though the housing hac been removed from its base plate for repairs.

A further feature of the invention relates to the relative position of a projection on the housing which extends into the path of an arm of the switch hook operating mechanism to prevent movement of the switch hook operating mechanism to its maintained on-hook position when the housing is secured on its base plate.

Other objects and features of the invention not specifically mentioned will be apparent from the following description of the accompanying drawings in which.

Figure 1:
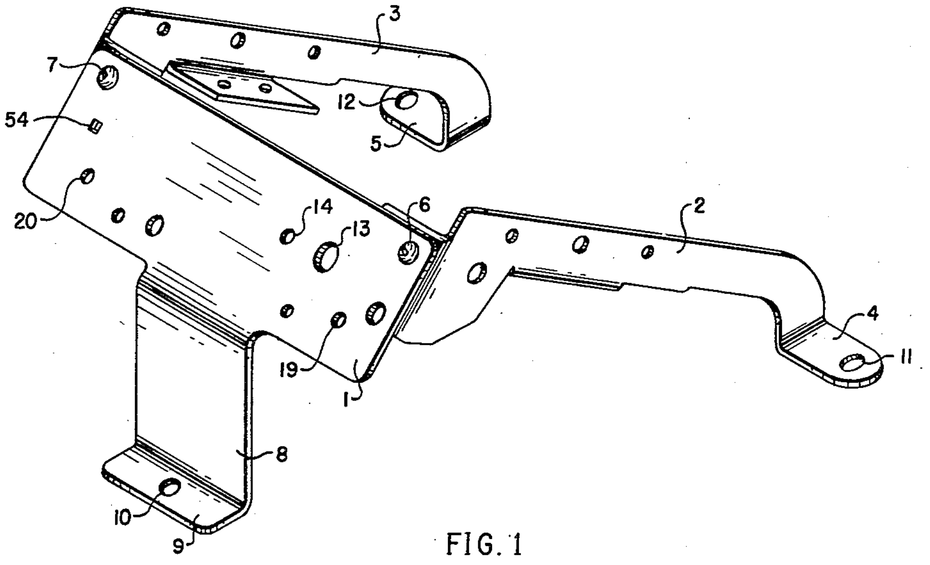
Fig. 1 is a perspective view of the stationary mounting bracket of the switch hook assembly.
Figure 2:
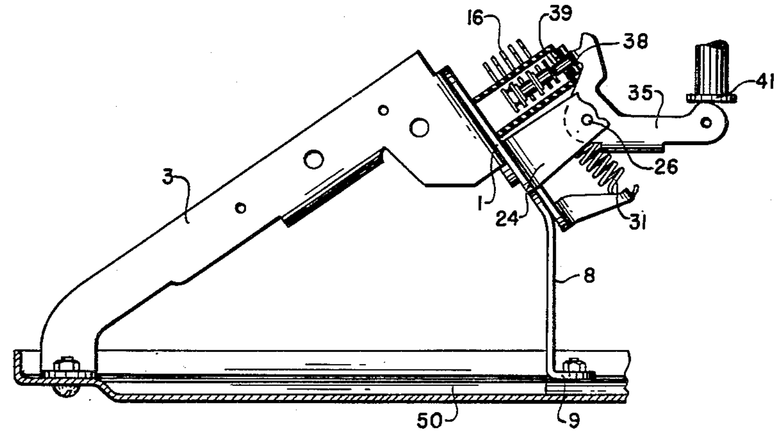
Fig. 2 is a side view of the stationary bracket including the contact springs and the movable lever mounted on the bracket.

Referring more particularly to the drawings, Fig. 1 shows a stationary bracket 1, upon which, a pair of legs 2 and 3 are secured by means of flat head machine screws 6 and 7. Each of the legs has a foot such as 4 and 5 which have holes 11 and 12. A projection 8 on bracket

1 has an ear 9 which also has a hole 10. The stationary bracket 1 and the legs 2 and 3 are mounted on a base plate 50 through holes 10, 11 and 12 by means of machine screws.

Figure 5:
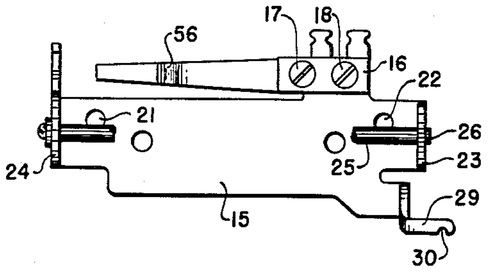
Fig. 5 is a front view of a supporting member upon which the switch hook contacts are mounted.

On supporting member 15, as seen in Fig. 5, the switch hook contact springs 16 are mounted by means of machine screws 17 and 18 and threaded holes in member 15. Extensions of these screws pass through holes 13 and 14 shown in Fig. 1. The supporting member 15 is secured to bracket 1 by means of machine screws (not shown) which pass through holes 21 and 22 of member 15 and screw into threaded holes 19 and 20 of bracket 1 shown in Fig. 1. Two flanges 23 and 24 extending from supporting member 15, as seen in Fig. 5, have holes through which, a pivot pin 25 is passed for rotatably fastening movable lever 28 to member 15. The supporting member 15 has a bent-over ear 29, on which a groove 30 is provided for holding one end of an operating spring 31. The other end of operating spring 31 is fastened to the movable lever 28 by means of a groove 32 on an arm extension 33.

Figure 3:
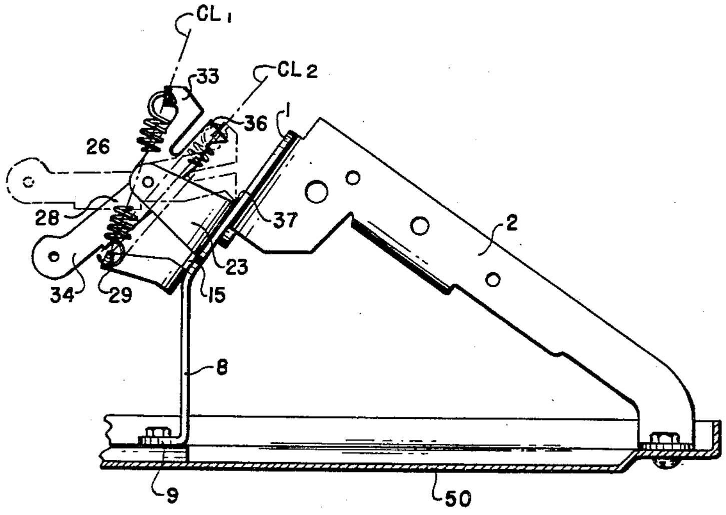
Fig. 3 is a side view of the stationary bracket including the movable lever in two of its positions.
Figure 4:
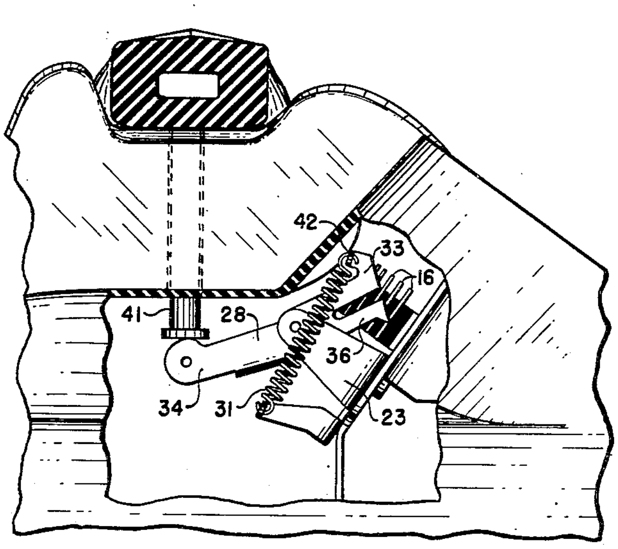
Fig. 4 is a side view with a portion of the housing being broken away to show the projection on the housing which prevents the operation of the lever beyond a predetermined limit when the housing is secured to the base.
Figure 6:
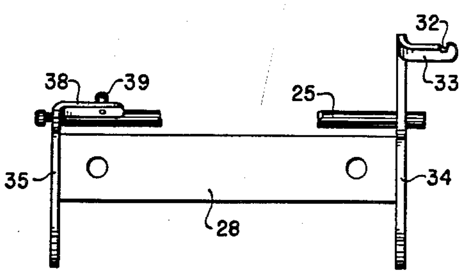
Fig. 6 is a top view of the movable lever.

The movable lever 28 shown in Fig. 6 consists of a flat bar with two arms 34 and 35. Arm 35 has a bent-over extension 38, on which a bushing 39 is mounted for operating the switch hook contact springs 16 to their on-hook or off-hook positions. In the middle of arms 34 and 35 there are two holes in which the pivot pin 25 is freely rotatable to permit rotation of lever 28. Arm 34 has a second extension 36 which engages one edge 37 of flange 23, in the event the lever arm 34 is moved to its off-hook or talking position as shown in dotted lines in Fig. 3. In case a handset is placed on the cradle lever arms 34 and 35 would be rotated counterclockwise as shown in Fig. 3 by the plungers 41 thereby disengaging bushing 39 from contact springs 16. The housing projection 42, as seen in Fig. 4 will be engaged by arm extension 34 to hold the lever arms 34 and 35 in a predetermined position. Likewise, when the handset is removed from the cradle, spring 31 rotates lever 28 to raise the plungers 41 and to operate bushing 39 to operate contact springs 16.

The chief object of the invention, as already pointed out, is to enable the repair man to receive an incoming call, even if the housing and the handset are removed. When the housing is removed, housing projection 42 is thereby disassociated from the extension arm 34. The result is that arm 34 and lever 28 can be manually rotated counterclockwise until it is stopped by the bent-over ear 29, as seen in full lines in Fig. 3. The manual movement of the lever arm 34 to the position, shown in full lines in Fig. 3, by the repair man after removal of the housing, causes the center line of the spring 31 to be shifted from the right side of the fulcrum or pivot point 26 to the left side thereof. Spring 31 now maintains lever 28 in on-hook position to enable the substation to receive incoming calls. In case the repair man wants to answer an incoming call, he simply lifts the lever arm 34 or 35 so that the center lines $CL_1$ of operating spring 31 will be shifted to $CL_2$ with the result that bushing 39 will operate contact springs 16 to their talking or off-hook position. It should be noted that when the housing is secured on the base plate 50, the housing projection 42 prevents the rotation of lever 28 to the maintained on-hook position shown in Fig. 3, as the projection 42 is engaged by extension arm 34 to limit the movement of lever 28.

Figure 7:
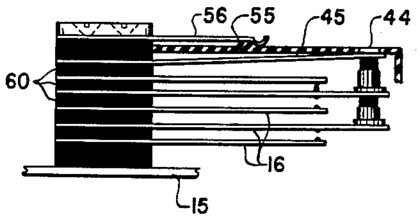
Fig. 7 is a side view of the switch hook contact springs and a section of its dust cover.
Figure 8:
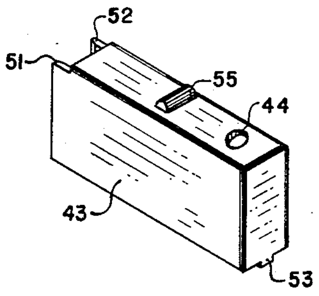
Fig. 8 is a plan view of the dust cover for the switch hook contact springs.

In order to render the contact springs 16 dust proof independent of the housing of the subset, a U-shaped transparent cover 43, shown in Fig. 8, is slipped around contact springs 16 with two edges 51 and 52 extended up to the insulators of the spring pile-up 60. A lug 53 is provided in the bottom of cover 43 for extending into hole 54 of bracket 1, shown in Fig. 1. A projection 55 on the top of the cover 43 cooperates with a flat spring 56 as shown in Fig. 7 in order to hold the cover 43 in position. This cover together with the design whereby the springs are actuated through the hole 44 serves to protect the springs from dust and thus greatly reduces the occurrence of contact failure.

It may be pointed out that the diameter of bushing 39 on lever arm 38 should be slightly smaller than that of hole 44 in the dust cover 43, so that bushing 39 can be easily extended through hole 44 in order to substantially close the hole when the movable lever 28 operates the springs to talking position. Likewise, the first of the contact springs 16 is a flat spring 45, which will close the hole 44 from the inside of the cover 43, when the movable lever 28 removes the bushing 39 from hole 44 to seal the opening against dust.

What is claimed is:

1. A telephone subset comprising a base, a handset, switch hook contacts having a talking position and a non-talking position, a removable housing enclosing said contacts and supported on said base, switching means including a lever having a first position for operating said contacts to talking position, when said handset is removed from said housing and a second position for operating said contacts to non-talking position when said handset is placed on said housing, a third position for said lever for maintaining said contacts in non-talking position while said housing is removed from said base, a spring attached to said lever for operating said lever to said first position to move said contacts to talking position when said handset is removed from said housing, said spring effective after removal of said housing from said base and after manual movement of said lever to said third position for maintaining said lever in said third position to thereby maintain said contacts in non-talking position.

2. A telephone subset comprising a base, a handset, switch hook contacts having a talking position and a non-talking position, a removable housing enclosing said contacts and supported on said base, switching means including a lever having a first position for operating said contacts to talking position when said handset is removed from said housing and a second position for operating said contacts to non-talking position when said handset is placed on said housing, a third position for said lever for maintaining said contacts in non-talking position while said housing is removed from said base, a spring attached to said lever for operating said lever to said first position to move said contacts to talking position when said handset is removed from said housing, said spring effective after removal of said housing from said base and after manual movement of said lever to said third position for maintaining said lever in said third position to thereby maintain said contacts in non-talking position, a transparent dust cover substantially covering said contacts, a hole in said transparent dust cover, a bushing on said lever slightly smaller in diameter than that of said hole for substantially closing said hole when said lever operates said contacts to talking position, and the first of said contacts comprising a flat spring closing said hole from the inside of said cover when said lever bushing is removed from said hole to cause said contacts to move to non-talking position, whereby the latter are protected from dust independently of said housing.

3. A telephone subset comprising a base, a removable housing secured to said base, a handset, a cradle on said housing adapted to receive said handset, a stationary bracket secured to said base, switch hook contacts mounted on said bracket, a movable lever for actuating said contacts, pivot means rotatably mounting said lever on said bracket, an extension arm on said bracket, an extension arm on said lever, a spring connecting said bracket extension arm to said lever extension arm and the center line of said spring normally being to one side of said pivot means, a stop on one end of said lever engaging said bracket to limit the rotation of said lever in one direction, projecting means in said housing cooperating with said lever extension arm for limiting the rotation of said lever in another direction when said housing is secured to said base, manual removal of said housing from said base removing said limiting projecting means from engagement with said lever extension arm to permit manual movement of said lever in said other direction thereby moving the center line of said spring to the other side of said pivot means, said spring thereafter holding said lever in said last moved direction for enabling said substation set to receive incoming calls or to originate outgoing calls.

4. A telephone subset comprising a base, switch hook contacts having an on-hook position and an off-hook position, a removable housing enclosing said contacts and supported on said base, a handset, switching means including a lever having a fulcrum near its center and operated in one direction when said handset is placed on said housing to operate said contacts to said on-hook position, a spring attached to said lever for operating said lever in the opposite direction when said handset is removed from said housing to operate said contacts to said off-hook position, projecting means on said housing adapted to be engaged by said lever to limit the movement of said lever in said one direction while said housing is supported on said base, manual removal of said handset and housing from said base and manual movement of said lever beyond said limit in said one direction by a repair man moving said spring from one side to the other side of said fulcrum, and said spring after being moved to said other side of said fulcrum holding said lever beyond said limit to maintain said contacts in on-hook position.

5. A telephone subset comprising a base, switch hook contacts having an on-hook position and an off-hook position, a removable housing enclosing said contacts and supported on said base, a handset, switching means including a lever having a fulcrum near its center and operated in one direction when said handset is placed on said housing to operate said contacts to said on-hook position, a spring attached to said lever for operating said lever in the opposite direction when said handset is removed from said housing to operate said contacts to said off-hook position, projecting means on said housing adapted to be engaged by said lever to limit the movement of said lever in said one direction while said housing is supported on said base, manual removal of said handset and housing from said base and manual movement of said lever beyond said limit in said one direction moving said spring from one side to the other side of said fulcrum, and said spring after being moved to said other side of said fulcrum holding said lever beyond said limit to maintain said contacts in on-hook position and said projecting means striking and moving said lever in said opposite direction to restore said spring to said one side of said fulcrum when said casing is again supported on said base.

6. A telephone subset comprising a base, a removable housing secured to said base, a handset, a cradle on said housing adapted to receive said handset, a bracket secured to said base, switch hook contacts mounted on said bracket, a lever for actuating said contacts, a pivot rotatably mounting said lever on said bracket, a spring connected to said lever and to said bracket on one side of said pivot and normally tensioned to rotate said lever and operate said contacts to off-hook position when said handset is removed from said cradle, plungers in said cradle operated by said handset when placed on said cradle for rotating said lever against said spring tension to operate said contacts to on-hook position, and means effective when said housing is removed from said base for manually rotating said lever to move said spring from said one side of said pivot to the other side of said pivot to thereby cause said spring to maintain said lever and said switch hook contacts in on-hook position, projecting means on said housing engaging and restoring said lever to return said spring from said other side of said pivot to said one side of said pivot when said housing is again secured to said base.

7. In a telephone subset as claimed in claim 6, wherein said projecting means also prevents movement of said spring from said one side to the other side of said pivot while the housing is secured to said base.

8. A telephone subset comprising a base, a removable housing secured to said base, a handset, a cradle on said housing adapted to receive said handset, a bracket secured to said base, switch hook contacts mounted on said bracket, a lever for actuating said contacts, a pivot rotatably mounting said lever on said bracket, a spring connected to said lever and to said bracket on one side of said pivot and normally tensioned to rotate said lever and operate said contacts to off-hook position when said handset is removed from said cradle, plungers in said cradle operated by said handset when placed on said cradle for rotating said lever against said spring tension to operate said contacts to on-hook position, and means effective when said housing is removed from said base for manually rotating said lever to move said spring from said one side of said pivot to the other side of said pivot to thereby cause said spring to maintain said lever and said switch hook contacts in on-hook position.

References Cited in the file of this patent

UNITED STATES PATENTS 2,566,840 Krumreich ------------- Sept. 4, 1951